Figure 1:
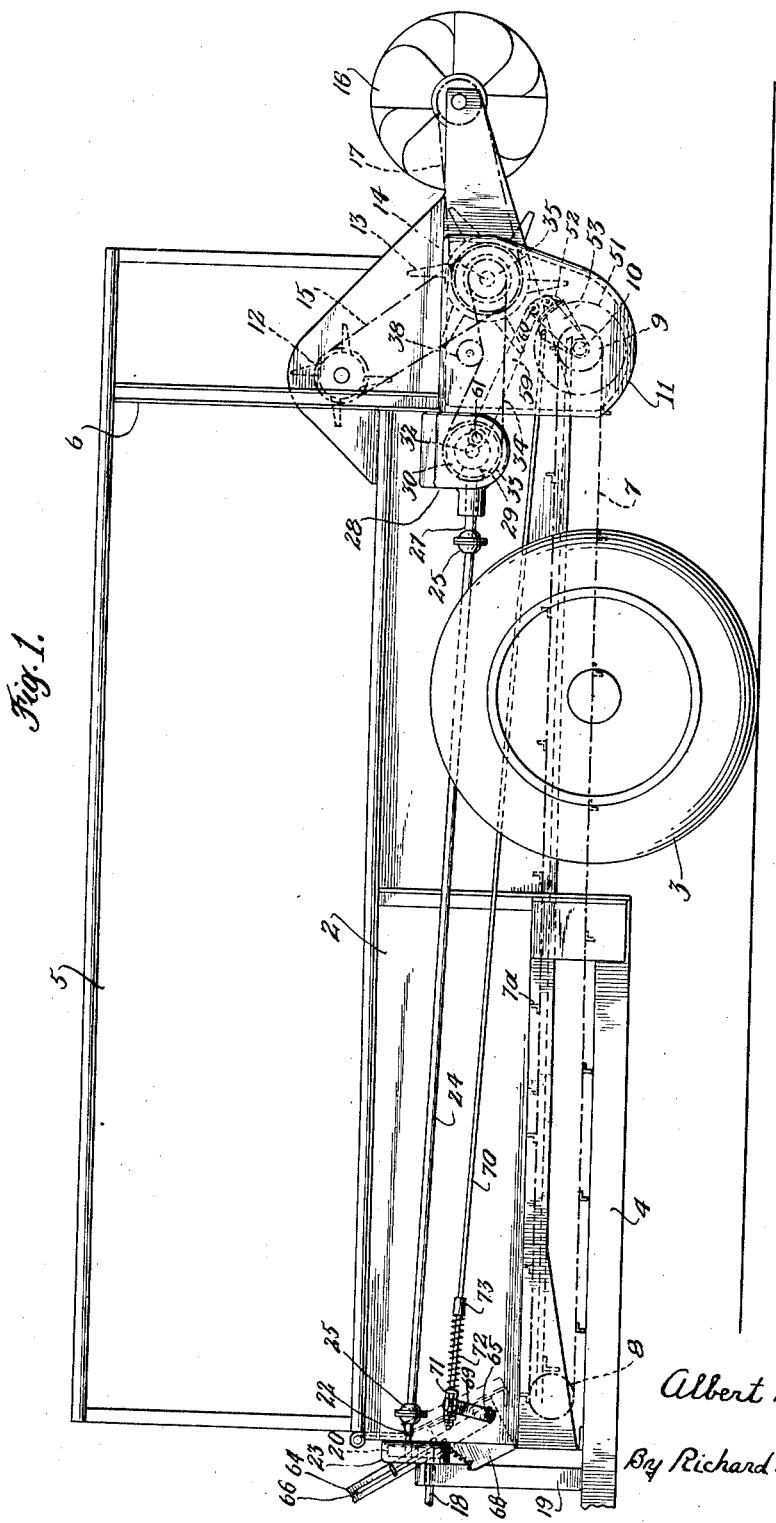

Jan. 11, 1955

A. M. BEST 2,699,337

MANURE SPREADER

Filed June 14, 1952

5 Sheets-Sheet 1

Inventor
Albert M. Best
By Richard E. Babcock Jr.
Attorney

Jan. 11, 1955

A. M. BEST 2,699,337

MANURE SPREADER

Filed June 14, 1952

5 Sheets-Sheet 3

Inventor
Albert M. Best
Richard E. Babcock Jr.

By

Attorney

Jan. 11, 1955

A. M. BEST 2,699,337

MANURE SPREADER

Filed June 14, 1952.

5 Sheets-Sheet 5

INVENTOR.
Albert M. Best
BY Richard E. Babcock Jr.
ATTORNEY

United States Patent Office 2,699,337
Patented Jan. 11, 1955

2,699,337

MANURE SPREADER

Albert M. Best, New Holland, Pa., assignor to The New Holland Machine Division of The Sperry Corporation, New Holland, Pa., a corporation of Delaware Application June 14, 1952, Serial No. 293,529

7 Claims. (Cl. 275—5)

This invention relates to manure spreaders and the like and more particularly to improvements in the driving and control mechanisms therefor.

It has been customary in conventional spreaders to provide feed means for moving the manure or other material rearwardly and discharging it at the rear of the body, where it is acted upon by suitable distributing mechanism. The feed mechanism is generally driven through a suitable pawl and ratchet wheel, either from a power take-off or from one of the ground wheels, and it has been known to regulate the rate of feed by means of a baffle, cam or the like adjustable element to engage the driving pawl throughout varying portions of its stroke and permit engagement of the pawl with varying numbers of ratchet teeth during the normally effective portion of its stroke. Also it has been known to provide disengageable means, such as a clutch, in the drive to the distributing mechanism.

Also, in accordance with the MacDonald Patent 2,344,317, it has been proposed to link both the feed drive control means and the distributor drive control means to a common control lever, through which both mechanisms may be controlled.

It is a primary object of this invention to provide a lost motion linkage between the feed drive control means and a disengageable coupling or clutch in the drive to the distributing mechanism, whereby actuation of the feed drive control means throughout a given range will not affect the operation of the distributing mechanism, but its operation beyond said range will disengage said coupling and interrupt the distributor drive.

It is a further object to provide such an arrangement in which, through controlling the position of the feed drive control element or baffle, it is possible to discontinue at will the operation of either the feed or the distributor mechanisms while leaving the other of said mechanisms fully operative.

It is a further object to provide such arrangement in which it is possible to vary the speed of the feed mechanism from zero to a maximum without affecting the operation of the distributing mechanism.

It is a still further object to furnish direct driving connections from a common rotary drive element to the feed mechanism and the distribution mechanism respectively, thus economizing on the amount of driving mechanism required and also effecting a simplification thereof.

Figure 2:
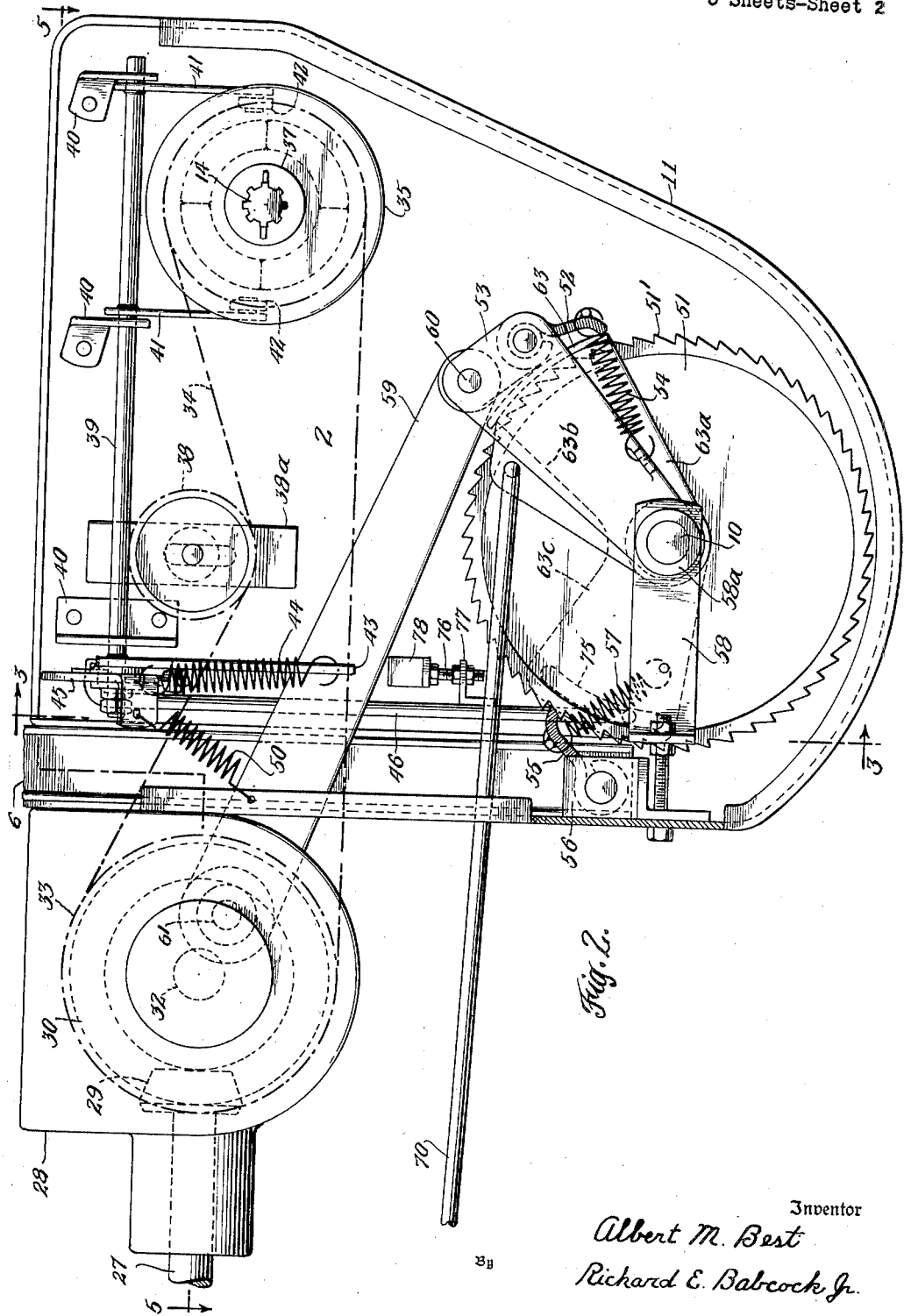
Figure 3:
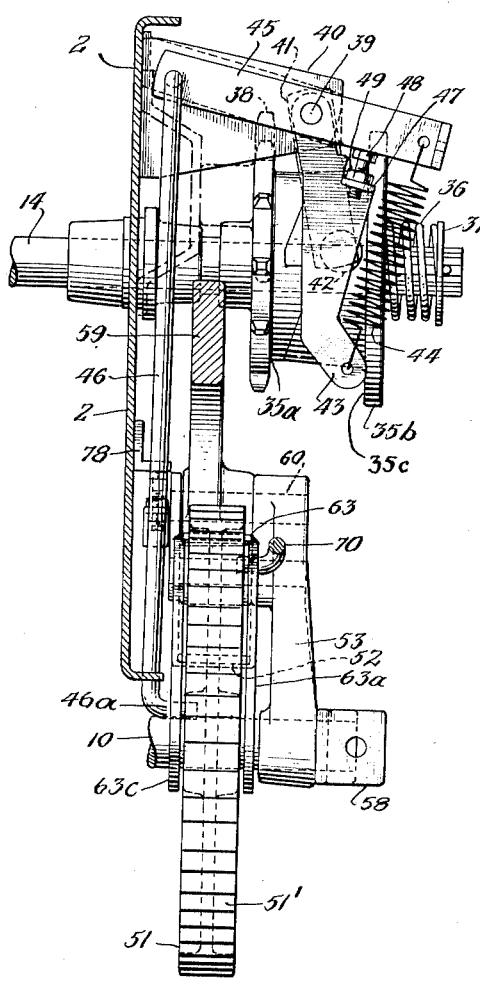
Figure 4:
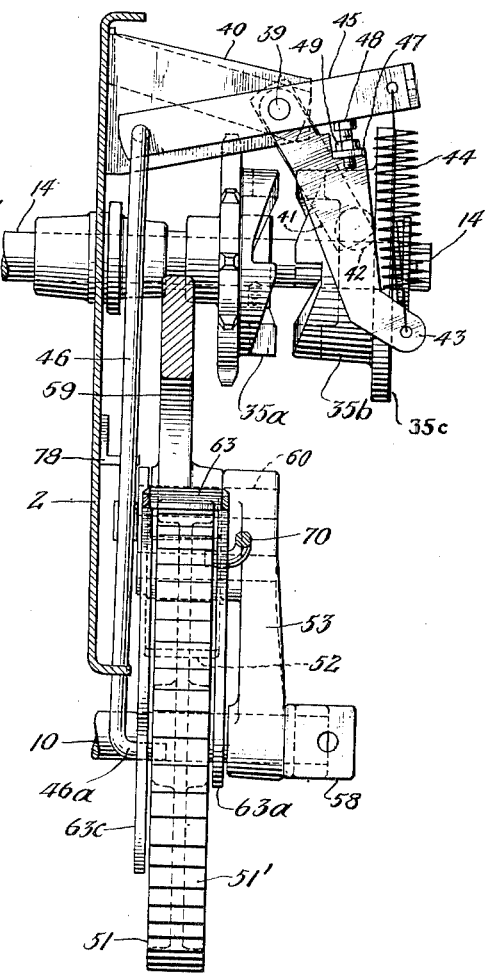
Figure 5:
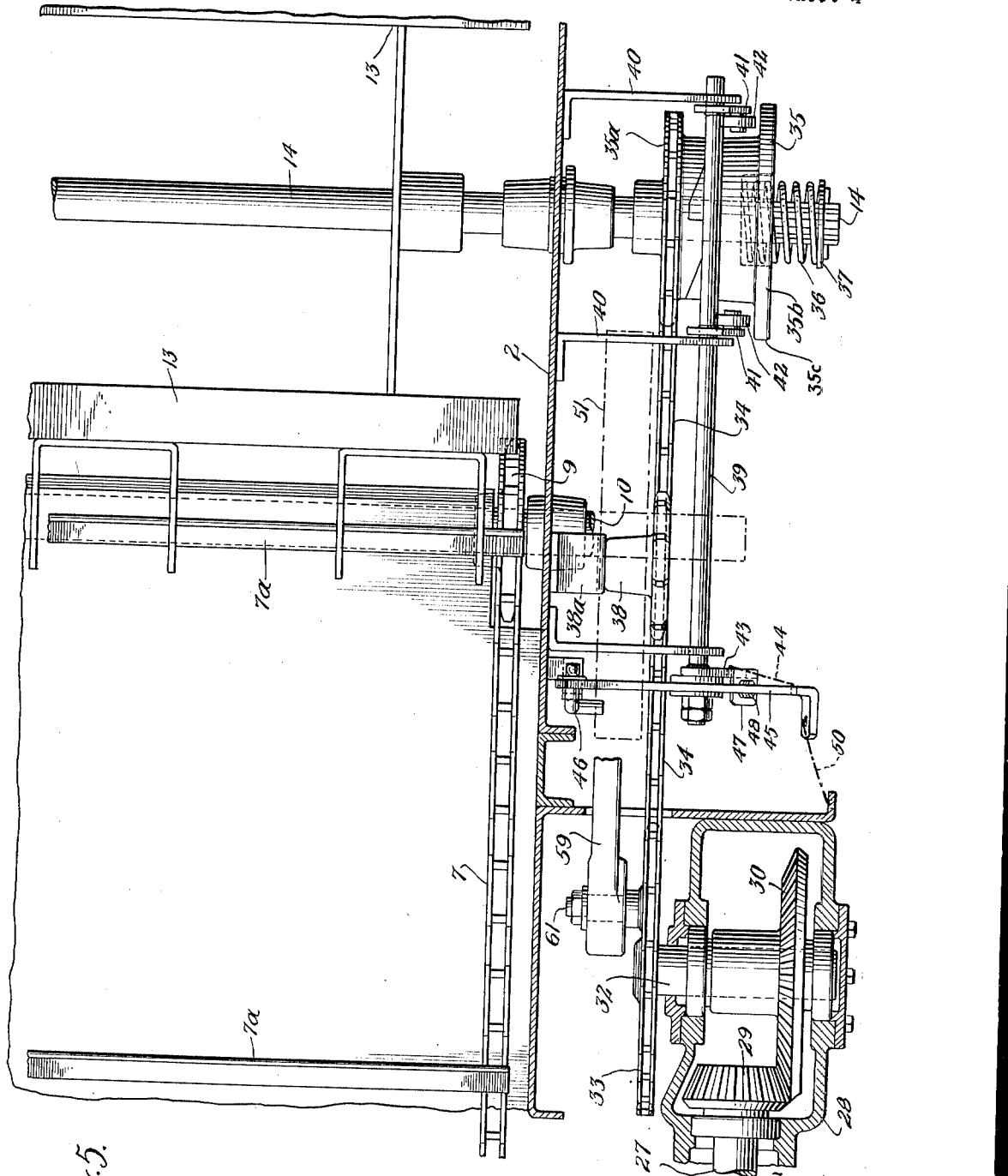
Figure 6:
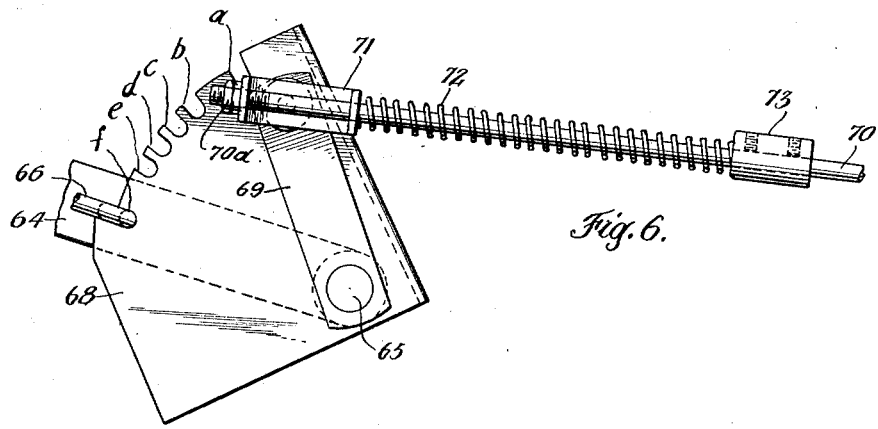
Figure 7:
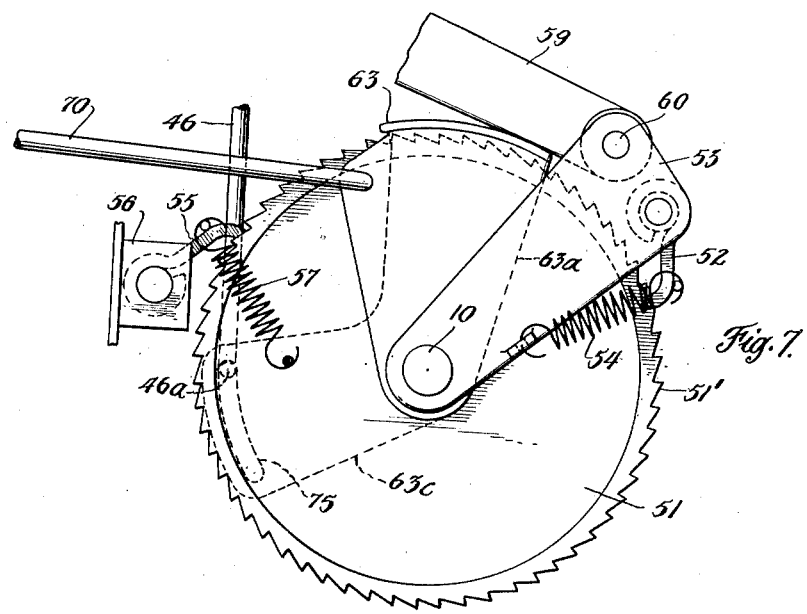
Figure 8:
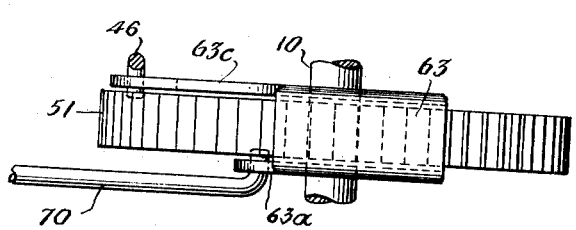

In the accompanying drawing:

Figure 1 is a side elevational view of a manure spreader embodying the invention;

Figure 2, an enlarged fragmentary elevational view of the ratchet, clutch and gear box mechanism;

Figure 3, a cross-section taken substantially on the line 3—3 of Figure 2, with the distributor clutch shown in engaged position and the ratchet drive to the feed mechanism shown in idling or non-driving position. For the sake of clarity, the chain idler sprocket is indicated in dot and dash lines;

Figure 4, a cross-section similar to Figure 3, but showing the clutch in disengaged position and the ratchet mechanism in driving position;

Figure 5, a plan section taken substantially on the line 5—5 of Figure 2, the ratchet wheel which is located below the plane of the section being indicated in dot and dash lines;

Figure 6, an enlarged fragmentary view of the control mechanism with the control lever moved to the position of maximum step movement of the ratchet wheel;

Figure 7, a face view of the ratchet mechanism as adjusted by the control lever when in the position of Figure 6; and, Figure 8, a plan view of Figure 7 with the pawls and pawl arm omitted.

Referring now in detail to the accompanying drawings, and first considering Figure 1, the reference character 2 designates a usual longitudinally disposed wagon box or body, such as is customarily employed with manure spreaders and the like. The rear end of this body 2 is supported on wheels 3 and, at its front end, it is provided with forwardly extending draft members 4 by which body 2 may be coupled to and have its front end supported by a usual farm tractor.

In the embodiment illustrated in Figure 1 the sides of the body 2 are formed with extensions 5 braced by uprights 6 to increase the capacity of the body 2 and adapt it for use in hauling forage as well as for manure spreading, though this constitutes no part of the instant invention.

Feed mechanism for delivering the contents of the body rearwardly and discharging same through the normally open rear end of the body 2, comprises the endless conveyor chains 7 connected by cross bars 7a movable rearwardly over the bottom of the body 2. The chains 7 are guided around sprockets 8 at the forward end of the body 2 and sprockets 9 fixed on a feed mechanism drive shaft 10 journalled across the rear end portion of the body 2.

The feed mechanism discharges material rearwardly from the wagon body 2 to be acted upon by suitable distributing mechanism which comprises a rotary upper beater 12, and rotary lower beater 13 fixed on a beater drive shaft 14 rotatably supported at the rear of the body 2, the upper and lower beaters being rotatably connected by a chain drive 15 to be driven from the same shaft 14. Also the distributing mechanism may comprise a usual wide spread attachment 16 connected by a chain drive 17 with the lower beater shaft 14 to be driven therefrom.

The feed mechanism and distributing mechanism, above described, merely exemplify well known types of such mechanism which may be used in conjunction with the invention and are not claimed per se as part of the invention.

The feed and distributing mechanisms may be driven from any suitable source of power, as for instance the usual power take-off of the tractor which draws the spreader over the ground. In the present embodiment, therefore, a drive shaft 18 adapted for connection with the power take-off of the tractor is rotatably supported on standard 19 carried by the draft members 4. A sprocket and chain drive 20 transmits rotary movement from the drive shaft 18 to a shaft 22 rotatably supported on the side of the wagon body 2 in a housing 23. A transmission shaft 24 extending along the side of body 2 is flexibly connected, as at 25—25, to the shaft 22 and a shaft 27 rotatably supported in a gear box 28 on the side of body 2 which has a pinion 29 keyed thereon interiorly of the gear box. Pinion 29 meshes with a bevel gear 30 fixed on a cross-shaft 32 journalled in the gear box 28, and a sprocket wheel 33 fixed on the shaft 32 exteriorly of the gear box is thus driven from the power take-off through the shafts 18, 22, 24, 27 and 32.

The drive for the distributing mechanism is through a sprocket chain 34 operatively connecting wheel 33 to the sprocket toothed portion or flange of the constantly rotating member 35a of a disengageable coupling such as the clutch 35 located on the beater drive shaft 14 within a housing 11 on the side of body 2. Thus the sprocket chain 34 and clutch 35 comprise the power transmission means between the wheel 33 and the distributing mechanism.

Referring to Figures 3 and 4 of the drawings, the constantly rotating or driving clutch member 35a is freely rotatable on the lower beater shaft 14 and a driven clutch member 35b splined on or otherwise slidably disposed on shaft 14 for rotation therewith is normally urged into operative driven engagement with the driving clutch member 35a by a spring 36 disposed on shaft 14 under compression between driven clutch member 35b and a stop 37 on the shaft 14. An idler sprocket 38 (Figure 2) may be mounted for vertical adjustment on a bracket 38a in engagement with one run of the chain 34 to maintain said chain at the desired degree of tension, in accordance with usual practice.

Clutch control means for moving the clutch member 35b axially away from the member 35a, against the pressure of spring 36 comprises a rock shaft 39 journalled through brackets 40 on the side of body 2. Fixed on the rock shaft 39 are clutch actuating arms 41 depending on opposite sides of driven clutch member 35b, each arm preferably having a roller 42 rotatably supported at its free end. The rollers 42 are disposed for engagement with a flange 35c of member 35b at diametrically opposed locations on the opposite axial side of said member from the spring 36, and thus are operable responsive to rocking of the shaft 39 to disengage the driven clutch member 35b from its cooperating drive member 35a and thereby disconnect the drive to the distributing mechanism.

Rocking movement of the shaft 39 within the range required to control the clutch 35 is transmitted through a control arm 43 fixed on the forward end of rock shaft 39, as best shown in Figures 3, 4 and 5.

It is desirable that the rocking force or torque applied to the rock shaft 39 to disengage the clutch 35 be a resiliently yielding one, to thus avoid too great a stress on and possible damage to the various control parts and linkages in the event the axial disengaging movement between the clutch members 35a and 35b is strongly resisted by frictional engagement between the interengaging dogs or portions of the respective clutch members such as might be produced when the distributing mechanism 12, 13, 16 is operating under unusually heavy loads.

Accordingly, operative clutch disengaging movement is transmitted to the control arm 43 through a tension spring 44 which connects its free end to one end of a lever 45 medially pivotally mounted on the rock shaft 39, the opposite end of lever 45 being connected by a rigid link 46 to the feed adjusting mechanism hereinafter described, whereby both the feed mechanism and the distributing mechanism of the invention may be controlled in proper sequence by a common control means.

As shown in Figures 3 and 4, the control arm 43 is provided with a bracket or tab 47 projecting beneath the lever 45 and having an abutment, preferably in the form of a bolt 48 threaded therethrough in a position to be positively engaged by the lever 45 when same is swung in a direction (a clockwise direction as viewed in Figure 3) to permit engagement of the clutch members 35a, 35b. A jam nut 49 on the bolt 48 functions to secure the bolt 48 in any desired position of endwise adjustment through the bracket 47. The bolt 48 may be adjusted as desired to secure the proper clearance between the rollers 42 and clutch member 35b when the latter is in driven engagement with clutch member 35a. The adjustment will preferably be such that when the clutch members 35a and 35b are engaged, the rollers 42 at the ends of actuating arms 41 will be completely disengaged from the rotating member 35b to avoid unnecessary wear. A spring 50 under tension between the housing 11 and the free end of lever 45 normally urges said lever in a direction to maintain the rollers 42 disengaged from the clutch member 35b.

The drive for the feed mechanism is through a ratchet wheel 51 keyed on the feed drive shaft 10 in housing 11 and intermittently driven by a pawl 52 pivoted on an arm 53 which is mounted for oscillation on the shaft 10, as clearly shown in Figures 3, 4 and 7. The pawl 52 is maintained in operative engagement with the ratchet wheel 51 by a spring 54 disposed under tension between the pawl 52 and the arm 53. Cooperating with the pawl 52 to prevent retrogressive movement of the ratchet wheel 51 during the reverse oscillations of the arm 53 is a pawl 55 pivotally supported on a bracket 56 in the housing 11 and maintained in operative engagement with the wheel 51 by spring 57.

In order to firmly support the end of the feed drive shaft 10 against flexing in response to the driving thrusts transmitted through the pawl 52, the outer end of this shaft is journalled in a bearing 58a carried by a brace 58 adjustably mounted in the housing 11, as best shown in Figure 2.

Oscillating motion may be transmitted to the arm 53 from any suitable source, though in the present embodiment it is preferred to use an arrangement in which a pitman 59 pivotally connected at one end to the arm 53, as at 60, has its other end journalled on a crank pin 61 on the drive sprocket or sprocket wheel 33, to thus form an oscillating drive coupling between the sprocket wheel 33 and arm 53. Thus in the preferred embodiment of the invention, the sprocket wheel 33 functions as a common drive means for both the feed mechanism and the distributing mechanism.

Feed adjustment and control

Adjustment of the rate of feeding of material to the distributing mechanism is attained through a shroud or baffle 63 (Figures 2, 3, 4 and 7) extending over the toothed periphery of the ratchet wheel 51 and supported on leg portions 63a and 63b for adjustment about the shaft 10 so that the shield or baffle 63 may be interposed to varying degrees between the oscillating ratchet pawl 52 and the teeth 51' of ratchet wheel 51 which may at any given time lie within the range of oscillating movement of the pawl 52, to thus block off any desired number of these teeth from engagement by the pawl 52.

Adjustment of the shield or baffle 63 may be accomplished by a hand lever 64 (Figures 1 and 6) fixed on a rotatably supported cross shaft 65 at the front end of the body 2 and having a movable detent 66 cooperating with the notched arcuate edge of a stationary quadrant plate 68 on the front end of body 2 to maintain the lever 64 and shaft 65 in any of a number of predetermined positions of rotary adjustment.

Fixed on the shaft 65 at one side of the body 2 is a crank arm 69 which is connected by a link 70 with the shield or baffle 63 to adjust the baffle in accordance with the position of the hand lever 64.

The notches in the edge of the quadrant plate 68 are preferably so spaced and located that with the hand lever 64 at its extreme clockwise position of adjustment, with the detent 66 in notch a, as in Figure 1, the baffle 63 is positioned as in Figure 2, to block off the pawl 52 from operative engagement with any of the ratchet teeth on the wheel 51. With the hand lever in this position, the distributing means will nevertheless be operable and can thus gain proper operating momentum before the feed mechanism commences to deliver material and impose a load on the distributing mechanism.

As the hand lever 64 is positioned with the detent 66 in the notch b, the baffle 63 will be swung to expose one of the teeth 51' of ratchet wheel 51 to engagement by the pawl 52, and successive adjustments of the hand lever to position its detent in notches c, d and e respectively will successively expose greater numbers of ratchet teeth on the wheel 51 to the action of pawl 52. Thus the rate of feed may be adjusted as desired or stopped altogether by manipulation of the hand lever 64.

Positioning of the hand lever 64 in notch f will not only expose the maximum number of ratchet teeth for engagement by the pawl 52, but will in addition function through the linkage hereinafter described to disengage the clutch 35 and thus discontinue the operation of the distributor mechanism.

Since it is obviously desirable to avoid damage to the pawl 52, baffle 63 and associated parts which might result from jamming and locking the pawl 52 between the baffle 63 and one of the ratchet teeth 51' as the lever 64 is swung in a clockwise direction, the preferred embodiment of the invention utilizes a yielding connection between the crank arm 69 and link 70 to yield when the baffle 63 contacts the pawl 52 at a time when the latter operatively engages one of the ratchet teeth.

Such a yielding connection is formed, as in Figure 6, by a bracket 71 pivotally secured on the end of crank arm 69 and slidably receiving one end of the link 70. A spring 72 disposed under compression between the bracket 71 and a sleeve 73 fixed on link 70 transmits motion from the crank arm 69 to the feed mechanism. It will be seen that the spring 72 will yield resiliently in the event the movement of the link is halted by engagement of the ratchet pawl 52 by the baffle 63 at a time when the pawl 52 is in operative engagement with one of the ratchet teeth 51'. Thus bending or damaging of the link 70 or other elements will be avoided.

It will be seen that jam nuts 70a on the end of link 70 provide a positive abutment for engagement by the bracket 71 during retraction of the baffle 63 to uncover additional ratchet teeth 51' on the wheel 51, and also provide means for initial adjustment of the movement of the baffle 63.

Coaction between feed adjustment and clutch

In accordance with the invention, the control for the distributing mechanism 12, 13, 16 is so interconnected with the feed adjusting and controlling mechanism above described that both may be controlled in proper sequence by the hand lever 64.

For this purpose the rigid connecting link 46 extending from the clutch control lever 45 of the distributing mechanism, has its lower end 46a bent at right angles and slidably disposed in an arcuate slot 75 in an integral radial arm or portion 63c of the baffle 63. See Figures 2, 3, 4, 7 and 8 of the drawings.

The circumferential extent of the slot 75 is so chosen as to permit lost motion between the link 46 and the baffle 63 throughout the normal range of adjustment of the baffle, in which the hand lever 64 may be positioned with its detent 66 in any one of the notches a to e of the quadrant plate 68 shown in Figure 6. However, when the lever 64 is located with its detent in notch e the relation between the link 46 and slot 75 is such that the link end 46a will be positioned against the upper end of slot 75. Thereafter, further counterclockwise movement of the baffle 63 as caused by adjustment of the hand lever 64 so that its detent is received in notch f of the quadrant 68, as in Figure 6, will cause the abutting end of slot 75 to move the link 46 downwardly, thereby functioning through the clutch control lever 45, rock shaft 39 and arms 41 to disengage the clutch 35 through which the distributing means is driven.

This operative relationship is desired when, after spreading a load of material, it is desired to completely empty and clean the body 2. With the feed mechanism operating at full speed, the material remaining in the body 2 will be discharged in minimum time, and due to discontinuance of the operation of the distributing mechanism, such mechanism, and particularly the lower beater thereof, cannot function to obstruct discharge of the material or throw portions thereof back into the body 2.

Referring to Figure 2, there is shown adjusting means for properly coordinating the range of operative movement of the link 46 with that of the baffle 63 so that these two parts may cooperate in the manner above described. The adjusting means comprises a bolt 76 adjustable through a bracket 77 fixed on the link 46. The head of bolt 76 is disposed for abutment against a stop 78 fixed on the body 2.

The overall operation of the invention, which is believed to be readily apparent from the foregoing description is as follows:

After being filled with manure, the spreader is transported to the field, and during such transport the power take-off from the tractor will normally be disengaged or inoperable to avoid driving either the feed mechanism or the distributing mechanism.

Upon arrival at the scene of operations, the power take-off is placed in operation, the control lever 64 first having been positioned with its detent in notch a of the quadrant 68, whereby only the distributing mechanism will at first be rendered operative. Then, with the distributor mechanism in operation, the lever 64 may be positioned with its detent in any of the notches b to e inclusive, depending on whether it is desired to have the ratchet wheel 51 rotate in steps of 1, 2, 3 or 4 notches respectively to discharge material at a corresponding rate for action by the distributor mechanism.

Upon completion of the spreading operation, when it is desired to completely discharge and clean out the content of the spreader, the lever 64 may be positioned with its detent in the notch f, as in Figure 6. This will cause the feed mechanism to operate at its maximum speed, and, by virtue of the linkage 46 between the baffle 63 and the clutch control lever, will disengage the clutch or coupling 35 to disconnect the drive to the distributor mechanism. This will permit unimpeded discharge of the contents of the wagon box and will avoid the difficulty heretofore experienced of having the distributor mechanism throw back into the wagon box a certain proportion of the discharged material.

In this application there is shown and described only the preferred embodiment of the invention, simply by way of illustration of the practice of the invention, as by law required. However, the invention is capable of other forms or embodiments, and its several details may be modified in various ways, all without departing from the invention. Accordingly it will be readily understood that the drawings and description herein are merely illustrative, and not exclusive in nature.

Having thus described my invention, I claim:

1. In a manure spreader of the class in which a feed mechanism is operative to discharge material rearwardly from a longitudinally disposed body for action by distributing mechanism, the combination with said spreader of a rotary drive element mounted on said body and means transmitting rotation thereto, driving mechanism between said element and the distributor mechanism, a normally engaged clutch interposed in said mechanism, a ratchet wheel in driving relation with said feed mechanism, an arm mounted for oscillation about the axis of said ratchet wheel and a pawl carried by said arm for driving engagement with said wheel, means establishing an operative drive connection, from said drive element to said arm to cause oscillation of the latter, means for adjusting the rate at which said ratchet wheel is driven by said arm and pawl, said means including a baffle plate adjustable about the axis of said wheel and said pawl, to thus block off various of the ratchet teeth from engagement by the pawl, control means for positioning and maintaining said baffle plate in various predetermined positions of adjustment, a control lever for said clutch, and means establishing a lost motion connection between said control lever and said baffle plate, the extent of lost motion being such as to permit engagement of the clutch and consequent operation of the distributor mechanism until the said baffle is positioned to permit maximum speed of operation of the feed means, a positive connection thereafter being established between said baffle and said control lever, whereby continued movement of said baffle will actuate said lever to disengage the clutch and thereby render the distributor mechanism inoperative.

2. In a manure spreader of the class in which a feed mechanism is operative to discharge material rearwardly from a longitudinally disposed body for action by distributing mechanism, the combination with said spreader of a rotary drive element mounted on said body and means transmitting rotation thereto, driving mechanism between said element and the distributor mechanism, a normally engaged clutch interposed in said mechanism, a ratchet wheel in driving relation with said feed mechanism, an arm mounted for oscillation about the axis of said ratchet wheel and a pawl carried by said arm for driving engagement with said wheel, means establishing an operative driving connection between said arm and said drive element to cause oscillation of said arm, means for adjusting the rate at which said ratchet wheel is driven by said pawl, said means including a baffle plate adjustable about the axis of said wheel between said wheel and said pawl, control means for positioning and maintaining said baffle plate in various predetermined positions of adjustment, a control lever for said clutch, and means for actuating said control lever to disengage said clutch responsive to adjustment of said baffle plate in a position to cause driving of such ratchet wheel at a predetermined rate above the normal operating feed rate of the feed mechanism.

3. In a manure spreader having a feed mechanism and a distributor mechanism, the combination comprising a rotary drive element, transmission means normally transmitting driving movement from said element to said distributing mechanism, a disengageable coupling included in said transmission means, and control means associated with said coupling for disengaging same, in combination with drive means for said feed mechanism including a ratchet wheel coupled to said feed mechanism, an arm mounted for oscillation about the axis of said wheel and having a pawl disposed for driving engagement with said wheel, a rigid link eccentrically connecting said arm to said rotary drive element to transmit oscillating movement to said arm, means for adjusting the rate at which said ratchet wheel is driven by said pawl, said means including a baffle plate adjustable to varying degrees between said ratchet wheel and said pawl, and means establishing a lost motion connection between said baffle plate and said coupling control means the extent of lost motion being such as to permit operation of said distributing mechanism in some positions of said baffle and to disengage said coupling in one position of said baffle.

4. In a manure spreader having a feed mechanism and a distributor mechanism, the combination comprising a rotary drive element, transmission means normally transmitting driving movement from said element to said distributor mechanism, a disengageable coupling included in said transmission means, and control means associated with said coupling for disengaging same, in combination with drive means for said feed mechanism including a ratchet wheel coupled to said feed mechanism, an arm mounted for oscillation about the axis of said wheel and having a pawl disposed for driving engagement with said wheel, means for oscillating said arm, movable means for adjusting the rate at which said ratchet wheel is driven by said pawl, and means for actuating said control means to disengage said coupling responsive to movement of said adjusting means to a position for causing driving of said feed mechanism at a predetermined rate greater than its minimum rate.

5. In a manure spreader having a feed mechanism and a distributing mechanism, the combination comprising a rotary drive element, transmission means normally transmitting driving movement from said element to said distributing mechanism, a disengageable coupling included in said transmission means, and control means associated with said coupling for disengaging same, in combination with drive means for said feed mechanism including a ratchet wheel coupled to said feed mechanism, an arm mounted for oscillation about the axis of said wheel and having a pawl for driving engagement with said wheel, means for oscillating said arm, means for adjusting the rate at which said ratchet wheel is driven by said pawl, said means including a baffle plate adjustable to varying degrees between said ratchet wheel and said pawl, and means establishing a lost motion connection between said baffle plate and said coupling control means, the extent of lost motion being such as to permit operation of said distributing mechanism in some positions of said baffle and to disengage said coupling in one position of said baffle.

6. In a manure spreader having a feed mechanism and a distributing mechanism, the combination comprising a rotary drive element, transmission means normally transmitting driving movement from said element to said distributing mechanism, a disengageable coupling included in said transmission means, and control means associated with said coupling for disengaging same, in combination with drive means for said feed mechanism including a ratchet wheel coupled to said feed mechanism, an arm mounted for oscillation about the axis of said wheel and having a pawl disposed for driving engagement with said wheel, means for oscillating said arm, moveable means for adjusting the rate at which said ratchet wheel is driven by said pawl, and an interconnection between the moveable means and the control means for actuating said control means to disengage the coupling when said moveable means is positioned to produce driving of the ratchet wheel at its maximum rate.

7. The combination of claim 4 in which said means for actuating said control means comprises a linkage interconnecting said control means and said adjusting means, said linkage including a lost motion connection permitting movement of said adjusting means independently of the control means within a predetermined range to effect variation of the driving rate of said feeding mechanism.

References Cited in the file of this patent

UNITED STATES PATENTS

| | | |
|---|---|---|
| 851,928 | Goodhue | Apr. 30, 1907 |
| 1,215,614 | Brown | Feb. 13, 1917 |
| 1,540,884 | Hermann et al. | June 9, 1925 |
| 1,854,599 | Oppenheim | Apr. 19, 1932 |
| 2,094,572 | Hendricks et al. | Sept. 28, 1937 |
| 2,342,837 | Brown | Feb. 29, 1944 |
| 2,344,317 | MacDonald | Mar. 14, 1944 |
| 2,478,583 | Hybbert | Aug. 9, 1949 |